United States Patent [19]
Friedman

[11] 3,970,179
[45] July 20, 1976

[54] DIE HOLDER
[76] Inventor: Jerome Friedman, 39-39 29th St., Long Island City, N.Y. 11101
[22] Filed: June 10, 1975
[21] Appl. No.: 585,463

[52] U.S. Cl. .............................. 192/138; 64/28 R; 188/77 W; 188/82.3; 188/82.6
[51] Int. Cl.² .......................................... F16D 71/100
[58] Field of Search ..................... 192/138; 64/28 R; 188/82.3, 82.6, 77 W

[56] References Cited
UNITED STATES PATENTS

| | | | |
|---|---|---|---|
| 1,685,098 | 9/1928 | Sklovsky | 64/28 R |
| 2,506,784 | 5/1950 | Haydon | 192/138 X |
| 2,961,217 | 11/1960 | Sacchini | 188/82.6 X |
| 3,005,133 | 10/1961 | Key, Jr. et al. | 192/138 X |

Primary Examiner—Allan D. Herrmann
Attorney, Agent, or Firm—Philip Sands

[57] ABSTRACT

A die holder comprising a housing in which is freely journaled a spindle, the spindle terminating in a free end portion capable of supporting a die. A collar is mounted upon the spindle and is associated with a position-referencing system which governs an at-rest position of the spindle relative to the housing. At least one shearable pin or lug fixedly secures the collar to the spindle, the lug having a shear-resistance below the bending and shear-resistance of the spindle, the collar and the housing so as to be capable of shearing in the presence of the application of an excessive torque to the spindle before any damage occurs to the remainder of the die holder. The die holder also includes a releasable spring-clutch device interposed between the spindle and housing for overcoming any rotary force exerted against the spindle tending to rotate the latter to its at-rest position before the die held by the die holder is fully released from a workpiece.

12 Claims, 1 Drawing Figure

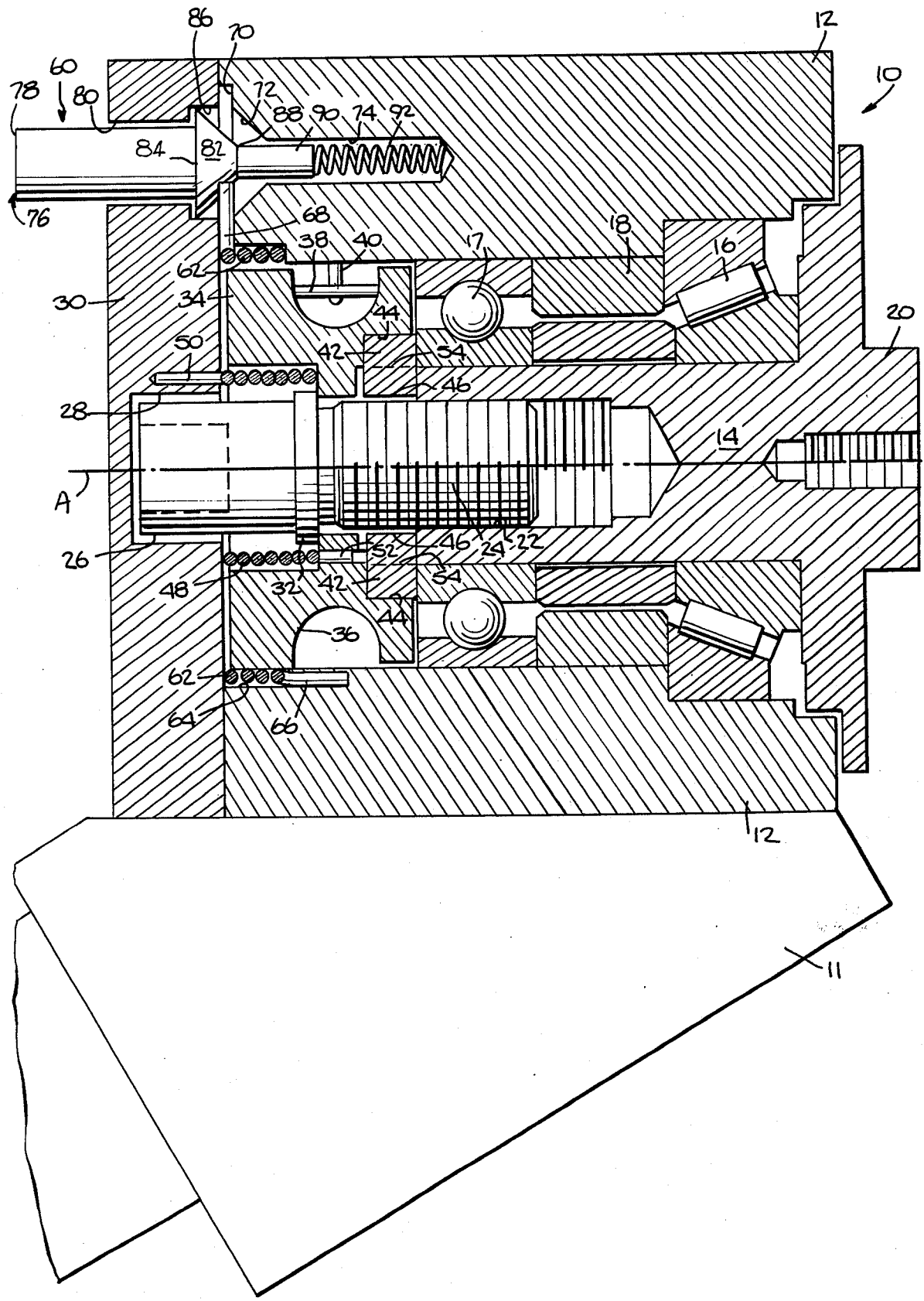

DIE HOLDER

BACKGROUND OF THE INVENTION

The present invention relates generally to the field of engraving, stamping and/or marking a workpiece with numerical, alphabetical and/or other visual intelligence. More particularly, the present invention relates to a die holder for moving a die having raised characters into and out of operative engagement with a workpiece to be marked by the die.

Although die holders of various types are well known in the art, they have in large measure varing drawbacks and disadvantages. One such drawback associated with conventional die holders is that upon application of an excessive torque to the spindle which supports the die (during the workpiece-marking operation), tending to rotate the spindle by an amount in excess of that which the spindle and/or its associated parts in the die holder have been designed for, there is the likelihood that the spindle and/or its associated parts may be overloaded and damaged, e.g. fractured or bent beyond repair.

A second such drawback involves the manner by which the die holder and die are withdrawn from a workpiece after the latter has been marked by the die. Since conventional die holders employ return-springs or the like for turning the spindle to its at-rest position immediately when the die is withdrawn and released slightly from the workpiece, before the die holder can be safely withdrawn from the workpiece by an amount which prevents the raised characters of the die from rotatably colliding with and scoring the workpiece as the spindle and the die are together turned to their common at-rest position, such return-springs rotate the spindle and die too early causing the raised characters of the die to bruise the workpiece.

One conventional means of preventing the aforementioned mishap from occuring is the use of a pawl-and-ratchet assembly which, until activated to release the spindle for rotation to its at-rest position when the die holder and die are withdrawn sufficiently from the workpiece, holds the spindle and die in a given rotary position during the period in which the die holder and die are initially withdrawn from the workpiece to prevent the die from marring or otherwise damaging the workpiece. However, the use of a pawl-and-ratchet assembly is unduly complicated and expensive.

SUMMARY OF THE INVENTION

Accordingly, it is an object of the present invention to provide a die holder which does not have the aforementioned drawbacks and disadvantages associated with conventional die holders.

More particularly it is an object of the present invention to provide a die holder that has incorporated in it shear pins or lugs which are adapted to shear in the presence of an excessive torque applied to the spindle to, thereby, prevent damage to the remainder of the die holder.

It is another object of the present invention to provide a die holder which is provided with a very inexpensive, simple and effective clutch for preventing the immediate return of the spindle and die to their common at-rest position when the die holder is withdrawn from the workpiece.

With the above objects in view, the present invention relates to a die holder having a housing in which is freely journaled a spindle, the spindle terminating in a free end portion capable of supporting a die. The die holder includes position-referencing means operatively associated with the housing and spindle for governing an at-rest position of the spindle. The position-referencing means comprises respective abutment means operatively associated with the spindle and housing for limiting rotation of the spindle to less than 360°, and resilient means for urging the spindle to a rotary position at which the respective abutment means of the spindle and housing are pressed against one another (the aforementioned at-rest position). A collar surrounds the spindle and carries the respective abutment means of the spindle along a rotary path engageable with the respective abutment means of the housing.

At least one shear pin or lug fixedly secures the collar radially to the spindle, the shear pin or lug having a shear-resistance below the bending and fracture-resistance of the spindle, the housing, the collar and the abutment means such that upon application of an excessive torque to the spindle tending to rotate the latter to a position at which the respective abutment means of the spindle and housing contact one another substantially 360° beyond the at-rest position of the spindle, the shear pin or lug shears at a circumferential parting line between the collar and spindle to rotatably free the spindle from the collar for rotation beyond 360° and thereby obviate damage to the spindle, the housing, the collar and the abutment means.

The die holder also includes a releasable spring-clutch means interposed between the spindle and housing for overcoming any rotary force exerted against the spindle tending to return it to its at-rest position and restrain the spindle against rotation to its at-rest position. The spring-clutch means includes a spiral-oriented spring surrounding and contacting the periphery of at least a portion of the spindle (or collar), the spring having an orientation upon the spindle (or collar) such that the slightest tendency of the spindle to turn to its at-rest frictionally causes the spring to circumferentially tighten and grip the periphery of the spindle (or collar). Associated with the spiral-oriented spring is a releasing device for at least slightly circumferentially enlarging the spring to free the spindle for rotation to its at-rest position.

BRIEF DESCRIPTION OF THE DRAWINGS

The above and additional objects and advantages of this invention will be more clearly understood from the following detailed description thereof when read in conjunction with the accompanying drawings, in which:

The one and only Figure is a schematic, vertical, cross-sectional view of the die holder of the present invention.

DETAILED DESCRIPTION OF THE PRESENT INVENTION

As illustrated, the present invention involves a die holder 10 carried by a base 11 whose position is readily adjustable opposite a workpiece (not shown). The die holder 10 includes a housing 12 in which is confined a spindle 14. Conically arranged frontal bearings 16 and cylindrically arranged distal bearing 17, separated from one another by spacers 18, freely support the spindle 14 for rotation relative to the housing 12.

The spindle 14 includes a stepped frontal end portion 20 upon which may be detachably secured a die (not shown), and a threadedly bored distal end portion 22 concealed in the housing 12. An enlarged bolt-like member 24 is threaded at its frontal end portion into the threadedly bored distal end portion 22 of the spindle 14. The bolt-like member 24 includes a cylindrical distal end portion 26 which extends freely into a recess 28 formed in a rear wall 30 of the housing 12. The bolt-like member 24 is furthermore provided with an annular flange 32 which exerts axial pressure against and fixes the axial location of a collar 34 on the spindle 14. Since the annular flange 32 of the boltlike member 24 only partially contacts the collar 34 over a small annular surface area, the collar 34 is capable of frictionally slipping and turning relative to the flange 32, but only in the presence of an excessive torque applied to the spindle 14.

The collar 34 is provided with an annular recess 36 across which extends, and in which is affixed, a position-referencing pin 38 which is engageable with the free end of a stop pin 40 whose opposite end is anchored internally of the housing 12. A pair of diametrically opposite, non-ferrous, metal lugs 42 (preferably copper or brass), each having a cross-section of approximately 3/16 of an inch, fixedly secure the collar 34 to the spindle 14 and prevent rotation of the spindle 14 and collar 34 relative to one another. Each lug 42 is provided with one portion fixedly seated in a respective one of a pair of recesses 44 formed radially and diametrically opposite each other in the collar 34, and an opposite portion seated in a respective one of a pair of recesses 46 formed radially and diametrically opposite each other in the spindle 14. Since the lugs are made or relatively soft material (brass or copper) compared to that of the remainder of the die holder 10 (which is for the most part steel), the lugs are adapted to shear in the presence of an excessive torque applied to the spindle 14. The purpose of this will be clarified below.

A coiled return spring 48 is interposed between the collar 34 and the bolt-like member 24, the spring 48 having an anchored end 50 in the rear wall 30 of the housing 12 and an opposite anchored end 52 in the collar 34. The return spring 48 tends to turn the collar 34, and thereby the spindle 14, to an at-rest position at which the position-referencing pin 38 extending across the annular recess 36 of the collar 34 is pressed against the stop pin 40 anchored in the interior of the housing 12.

In operation, the base 11, and thereby the die holder 10, is moved into proximity with a turning workpiece (not shown) such that a die (also not shown) mounted upon the end of the spindle 14 initially engages the workpiece to mark the latter with varying intelligence. During the period in which the workpiece is marked by the die, rotation of the workpiece is transmitted to the die and, thereby, to the spindle 14. As the spindle 14 turns, the return spring 48 tightens and stores potential energy for returning the spindle 14 to its at-rest position at which the position-referencing pin 38 engages the stop pin 40.

However, during an emergency condition in which an excessive torque is applied by the workpiece to the die, and thereby to the spindle 14, tending to rotate the spindle 14 to a position at which the position-referencing pin 38 and the top pin 40 are brought into engagement with one another substantially 360° beyond the initial or at-rest position of the spindle 14, the lugs 42 will shear or fracture cleanly at the circumferential parting line 54 between the collar 34 and the spindle 14.

The excessive torque applied to the die, and thereby to the spindle 14, is often initiated by continued rotation of the die by the workpiece beyond a selected extent. This may occur, for example, when a "low" point designed on the die to enable the die to be circumferentially released from the workpiece after the latter is marked fails to be entirely so released. Continued rotation of the workpiece will of course, therefore, cause the die and spindle 14 to continue to rotate until the position-referencing pin 38 engages the stop pin 40 substantially 360° beyond the at-rest position of the spindle 14. If the application of the torque to the die and spindle 14 continues further, and if that torque is sufficient, the shear pins or lugs 42 will accordingly fracture before damage can occur, to the housing 12, the spindle 14, the collar 34, the position-referencing pin 38 and the stop pin 40, etc. Damage is prevented because the spindle 14 is now freed from the collar 34, and is capable of rotating as necessary in excess of 360° from its initial or at-rest positon. Should the shear pins or lugs 42 fracture, they can be rapidly and inexpensively replaced.

In the absence of the application of an excessive torque to the spindle 14, the die holder 10 is generally withdrawn from the workpiece after the latter has been appropriately marked by the die. Since the return spring 48 has been tightened and provided with potential energy during the rotation of the spindle 14 away from its at-rest position (during the workpiece marking operation), there is the tendency for the spring 48 to immediately initiate the return of the spindle 14 to its at-rest position. If this were allowed to occur, the raised characters projecting from the die for marking the workpiece would strike, marr and otherwise damage the newly marked workpiece as the die is withdrawn from the workpiece. In the present invention, this is prevented by a spring-clutch unit 60.

The spring-clutch unit 60 includes a coil spring 62 seated in an annular clearance 64 provided between the housing 12 and the outer periphery of the collar 34. The spring 62 includes one end 68 anchored in the housing 12 and a free, upstanding, end portion 68 extending into a substantially semi-circular or like notch 70 confronting the rear wall 30 of the housing 12. The free, upstanding, end portion 68 of the spring 62 is movable, substantially pivotally, in a plane extending perpendicular to the axis of rotation "A" of the spindle 14. A conical recess 72 communicates with the notch 70 at one side and with a cylindrical bore 74 at the other side.

A plunger 76 is also provided as part of the spring-clutch unit 60, and includes an accessible and depressible end portion 78 projecting through an opening 80 in the rear wall 30 of the housing 12. The plunger 76 further includes a conical camming portion 82 having a wider end 84 confined in, and abutting against, an annular wall at the end of an opening 86 also formed in the rear wall 30 of the housing 12. The conical camming portion 82 terminates in an opposite narrow end 88 which restrains the free, upstanding, end portion 68 of the coil spring 62 against turning beyond it in one direction in the semi-circular notch 70. The plunger 76 additionally includes a cylindrical nose 90 extending into the cylindrical bore 74. The nose 90 is urged by a compression spring 92 outwardly of the cylindrical bore 74 such that the wider end 84 of the conical camming portion 82 engages, and is restrained against further outward movement by, the end wall of the opening 86.

As discussed above, rotation of the spindle 14 (during the period in which the die marks a workpiece) causes the return spring 48 to tighten and tend to reverse the rotation of the spindle 14 to its at-rest position. However, the coil spring 62 of the spring-clutch unit 60 is so anchored in the housing 12 and oriented upon the collar 34 with its turns or runs helically extending in a direction opposite of the helical direction of the turns or runs of the return spring 48, that the rotation of the spindle 14 away from its at-rest tends to circumferentially enlarge the coil spring 62 such that the latter releases, and does not interfere with or restrain rotation of, the spindle 14 in that direction only. Thus, the helical orientation of the spring 62 of the spring-clutch unit 60 is directly opposite of the helical orientation of the spring 48 which tends to return the spindle 14 to its at-rest position.

However, because of this opposite helical orientation relationship of the coil spring 62 with the return spring 48, when the die is withdrawn from the workpiece, and the spindle 14 ever so slightly begins to rotate to its at-rest position via the return spring 48, the coil spring 62 immediately responds and tightens about the collar 34 and frictionally grips and restrains the collar 34 against rotation, thereby preventing the spindle 14 from returning to its at-rest position. Thus, the die holder 10 and die can be fully withdrawn away from the newly marked workpiece without damaging the latter.

Once the die holder 10 is withdrawn from the workpiece, the plunger 76 can be depressed thereby causing the conical camming portion 82 thereof to axially engage and pivotally shift the free, upstanding, end portion 68 of the coil spring 62 in the notch 70. Such pivotal movement of the free, upstanding end portion 68 of the spring 62 causes the latter to circumferentially expand slightly. In turn, the collar 34 is released, and the return spring 48 becomes instantly operative to return the collar 34 and spindle 14 to their common at-rest position. The die holder 10 is thus fully deactivated for recycling and marking a further workpiece.

It will be understood that the foregoing description of a preferred embodiment of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. A die holder comprising: a housing; a spindle supported for rotation in and relative to said housing, said spindle terminating in a free end portion capable of supporting a die; position-referencing means operatively associated with said housing and spindle for governing an at-rest position of said spindle, said position-referencing means including respective abutment means operatively associated with said spindle and housing for limiting rotation of said spindle to less than 360° and resilient means for urging said spindle to a rotary position at which the respective abutment means of said spindle and housing are pressed against one another; collar means for carrying the respective abutment means of said spindle in a path and at a position engageable with the respective abutment means of said housing, said collar means including an inner annular flange, said spindle including annular flange means disposed axially beyond said inner annular flange at an end portion of said spindle opposite said free end portion of said spindle, said annular flange means pressing axially against said inner annular flange to prevent axial separation of said collar means from said spindle and frictionally resist turning of said spindle relative to said collar means; and shearable means for fixedly securing said collar means radially to said spindle to prevent the latter from turning relative to said collar means, said shearable means having a shear-resistance less than the bending and fracture-resistance of said spindle, housing, collar means and abutment means; whereby, upon the application of an excessive torque to said spindle tending to rotate the latter to a position at which the respective abutment means of said spindle and housing contact one another substantially 360° beyond said at-rest position of said spindle, said shearable means will shear at a circumferential parting line between said collar means and spindle to rotatably free said spindle from said collar means and thereby obviate damage to said spindle, housing, collar means and abutment means.

2. A die holder as claimed in claim 1, wherein said inner annular flange of said collar means is interposed between said annular flange means of said spindle and said shearable means and is pressed by said inner annular flange axially toward said free end portion of said spindle such that said collar means axially presses against said shearable means and through the intermediary of the latter axially against said spindle.

3. A die holder as claimed in claim 1, wherein said shearable means includes at least one non-ferrous metal lug having a portion seated radially in a conforming recess in said collar means and an opposite portion seated radially in a conforming recess in said spindle.

4. A die holder as claimed in claim 3, wherein said shearable means includes a second and similarly arranged lug diametrically opposite the first said lug and separated from the latter by said spindle.

5. A die holder as claimed in claim 3, wherein said lug is made of brass.

6. A die holder as claimed in claim 3, wherein said lug is made of copper.

7. A die holder as claimed in claim 3, wherein said lug has a shear cross-section of less than one-quarter of an inch.

8. A die holder comprising: a housing; spindle means supported for rotation in and relative to said housing, said spindle means including a free end portion extending outwardly of said housing and capable of supporting a die; position-referencing means operatively associated with said spindle means and housing for governing an at-rest position of said spindle means, said position-referencing means including respective abutment means operatively associated with said spindle means and housing for limiting rotation of said spindle means to less than 360° and resilient means for urging said spindle means to a rotary position at which the respective abutment means of said spindle means and housing are pressed against one another; releasable spring-clutch means interposed between said spindle means and housing for overcoming any rotary force exerted by said resilient means against said spindle means to restrain the latter against rotation to its said at-rest position, said spring-clutch means including a spiral-oriented spring surrounding and contacting the periphery of at least a portion of said spindle means, said spring having an orientation upon said spindle means such that any rotation of the latter to its at-rest position frictionally causes spring to circumferentially tighten and grip the periphery of said spindle means, and releasing means for at least slightly circumferentially enlarging said spring to free said spindle means for rotation to its said at-rest position.

9. A die holder as claimed in claim 8, wherein said resilient means of said position-referencing means is a spiral spring having a helical orientation opposite of the helical orientation of said spring of said spring-clutch means.

10. A die holder as claimed in claim 8, wherein said releasing means includes a free end portion of said spring which extends and is shiftable in a plane perpendicular to the axis of rotation of said spindle means.

11. A die holder as claimed in claim 10, wherein said releasing means further includes a spring-biased plunger having a camming surface engageable with and movable relative to said free end of said spring.

12. A die holder as claimed in claim 11, wherein said camming surface is substantially conical, said plunger having an at-rest position such that a low point of said conical camming surface is in engagement with said free end of said spring to retain said spring in a tightened condition restraining said spindle means against rotation to said at-rest position of the latter.

* * * * *